United States Patent
Fujita (10) Patent No.: US 7,929,184 B2
(45) Date of Patent: Apr. 19, 2011

(54) FACSIMILE COMMUNICATION SYSTEM AND IMAGE PROCESSING APPARATUS

(75) Inventor: Fusayuki Fujita, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 966 days.

(21) Appl. No.: 11/821,903

(22) Filed: Jun. 26, 2007

(65) Prior Publication Data
US 2008/0007790 A1    Jan. 10, 2008

(30) Foreign Application Priority Data
Jul. 6, 2006   (JP) .................................. 2006-186746

(51) Int. Cl.
H04N 1/00 (2006.01)

(52) U.S. Cl. ...... 358/400; 358/1.15; 358/403; 358/1.14; 709/224; 709/205; 709/206; 379/100.08; 379/211.01

(58) Field of Classification Search .................. 358/1.15, 358/400, 442, 1.14, 403; 709/224, 203, 215; 379/100.1, 211.01, 100.08, 100.09
See application file for complete search history.

(56) References Cited

U.S. PATENT DOCUMENTS

| | | | |
|---|---|---|---|
| 6,756,921 B2* | 6/2004 | Kimura et al. ................... 341/50 |
| 7,456,992 B2* | 11/2008 | Fukuhara et al. ............. 358/1.16 |
| 7,738,133 B2* | 6/2010 | Inakawa et al. .............. 358/1.16 |
| 2001/0007916 A1* | 7/2001 | Park .................................. 600/3 |
| 2004/0036635 A1* | 2/2004 | Kimura et al. ................ 341/107 |
| 2005/0097171 A1* | 5/2005 | Hikichi ......................... 709/204 |
| 2005/0190403 A1* | 9/2005 | Nakamura .................... 358/1.15 |
| 2006/0164675 A1* | 7/2006 | Yamada et al. .............. 358/1.15 |
| 2007/0061374 A1* | 3/2007 | Inakawa et al. .............. 707/200 |
| 2008/0114903 A1* | 5/2008 | Tadokoro et al. .................. 710/8 |
| 2009/0009793 A1* | 1/2009 | Ozawa et al. ................ 358/1.15 |

FOREIGN PATENT DOCUMENTS

| | | |
|---|---|---|
| JP | 2003-008819 | 1/2003 |
| JP | 2003-283742 | 10/2003 |
| JP | 2003-319128 | 11/2003 |
| JP | 2004-207991 | 7/2004 |
| JP | 2004-229041 | 8/2004 |
| JP | 2005-158038 | 6/2005 |
| JP | 2006-085406 | 3/2006 |

* cited by examiner

*Primary Examiner* — Negussie Worku
(74) *Attorney, Agent, or Firm* — David G. Conlin; Steven M. Jensen; Edwards Angell Palmer & Dodge LLP (57) ABSTRACT

Leakage of communication information concerning facsimile communication is prevented. A facsimile server manages communication information concerning facsimile communication. An image processing apparatus connects itself to the facsimile server to acquire communication information. Only a part of communication information is displayed, and a user selects a transmission destination. The image processing apparatus sends the designated transmission destination and image data to the facsimile server and requests facsimile communication. The facsimile server sends image data to the designated transmission destination.

7 Claims, 7 Drawing Sheets

| | TRANSMISSION DESTINATION | PROCESSING TIME | NUMBER OF PAGES | | PROGRESS STATE |
|---|---|---|---|---|---|
| 1 | ☎ | 14:25 12/09 | A4 | 15 SHEETS | TRANSMISSION COMPLETED |
| 2 | ☎ | 14:27 12/09 | A4 | 1 SHEET | TRANSMISSION COMPLETED |
| 3 | ☎ | 14:40 12/09 | A3 | 2 SHEETS | TRANSMISSION COMPLETED |
| 4 | ☎ | 14:47 12/09 | A4 | 13 SHEETS | TRANSMISSION COMPLETED |

FIG. 10

FACSIMILE COMMUNICATION SYSTEM AND IMAGE PROCESSING APPARATUS

BACKGROUND OF THE INVENTION

1. Field of the Invention

The present invention relates to a facsimile communication system in which an image processing apparatus and a server are connected through a network and facsimile communication can be carried out through the server.

2. Description of the Related Art

An image processing apparatus is multifunctional and thus can perform operations such as copying, printing, scanning and facsimile. The image processing apparatus is connected to an external apparatus such as a server and a personal computer so as to be capable of communication through a network. When the external apparatus outputs image data to the image processing apparatus, the image processing apparatus processes the image data and outputs the image data by printing, facsimile communication or the like.

Here, when image data is sent by facsimile, a facsimile server or a specific image processing apparatus is used as the external apparatus, as described in Japanese Patent Laid-Open No. 2003-283742. Facsimile communication is carried out through the facsimile server or specific image processing apparatus. By connecting a plurality of image processing apparatuses and facsimile servers throughout a network, a facsimile communication system is formed.

When facsimile communication is carried out, in the facsimile communication system, a transmission destination is selected based on communication information concerning facsimile communication, such as a transmission destination name and a transmission destination number. Communication information is stored in a storage device and registered, in one image processing apparatus. When facsimile communication is carried out, communication information read out from the storage device is displayed. A desired transmission destination is selected from the displayed list of transmission destinations.

Since communication information can be thus viewed, there is a danger that communication information is easily taken out by a malicious third party.

Image processing apparatuses each have communication information registered separately. Therefore, some apparatuses have communication information for a transmission destination which has not been registered. There may be a case where communication information for a desired transmission destination is not displayed when transmission is to be carried out by facsimile from other image processing apparatus. In this case, the transmission destination number should be inputted, the operations are not different from those of ordinary facsimile communication, and thus there is not much merit in employing a facsimile communication system.

Moreover, when communication information is updated if common communication information is registered in each image processing apparatus, update processing should be carried out separately for every image processing apparatus, and this task is complicated.

In view of the situation above described, an object of the present invention is to provide a facsimile communication system capable of unitarily managing communication information to protect communication information.

SUMMARY OF THE INVENTION

In the present invention, an image processing apparatus and a server having a facsimile communication function are communicatively connected, the server has management section managing communication information concerning facsimile communication, and the image processing apparatus has a transmission requesting section requesting the server for facsimile communication referring to the communication information.

It is not necessary for the image processing apparatus to possess communication information, and thus there is no possibility that communication information is taken out from the image processing apparatus, resulting in leakage of the information. The server can unitarily manage communication information, and by performing new registration and maintenance for renewal, the image processing apparatus can refer to updated communication information.

The image processing apparatus uses a server when carrying out transmission by facsimile. When the transmission requesting section requests the server for communication information, the server sends communication information. A transmission destination can be designated referring to the communication information. The transmission requesting section sends information of the transmission destination and image data to the server, whereby facsimile communication is requested. The server sends image data to the designated transmission destination.

The image processing apparatus has an information regulating section imposing a restriction on display of communication information acquired from the server by the transmission requesting section. When communication information is referred to, communication information is displayed. At this time, information regulation section processes and displays a part of communication information. For example, one of a transmission destination name and a transmission destination number is displayed. Namely, a restriction is imposed on communication information, and even if communication information is viewed by a third party, he or she cannot identify a transmission destination. Thus, communication information is protected from a third party.

The management section of the server prepares transmission history information of the requested facsimile communication. The management section manages transmission history information, and restricts access to transmission history information. Persons who can access transmission history information are only authorized persons, so that leakage of this information can also be prevented.

Communication information is shared, and a plurality of image processing apparatuses can refer to communication information. Communication information can be referred to from any of the image processing apparatuses. Therefore, the user can request facsimile communication from each image processing apparatus.

The management section of the server manages communication information for each enrolled user, the image processing apparatus sends to the server user information concerning a user who has operated the apparatus, and the server sends to the image processing apparatus communication information corresponding to the user who has operated the apparatus. By managing communication information for each user and carrying out facsimile communication as described above, personal information can be protected.

According to the present invention, communication information concerning facsimile communication can unitarily be managed in the server, and the image processing apparatus does not store communication information, thus making it possible to prevent leakage of information from the image processing apparatus. Therefore, information can be protected, and a system of security can be formed.

The image processing apparatus can carry out facsimile communication through the server, and accordingly, other processing can preferentially be carried out. For the user, the number of image processing apparatuses capable of carrying out facsimile communication increases, leading to an improvement in convenience. In the image processing apparatus, processing efficiency is improved.

DETAILED DESCRIPTION OF THE PREFERRED EMBODIMENTS

Figure 1:
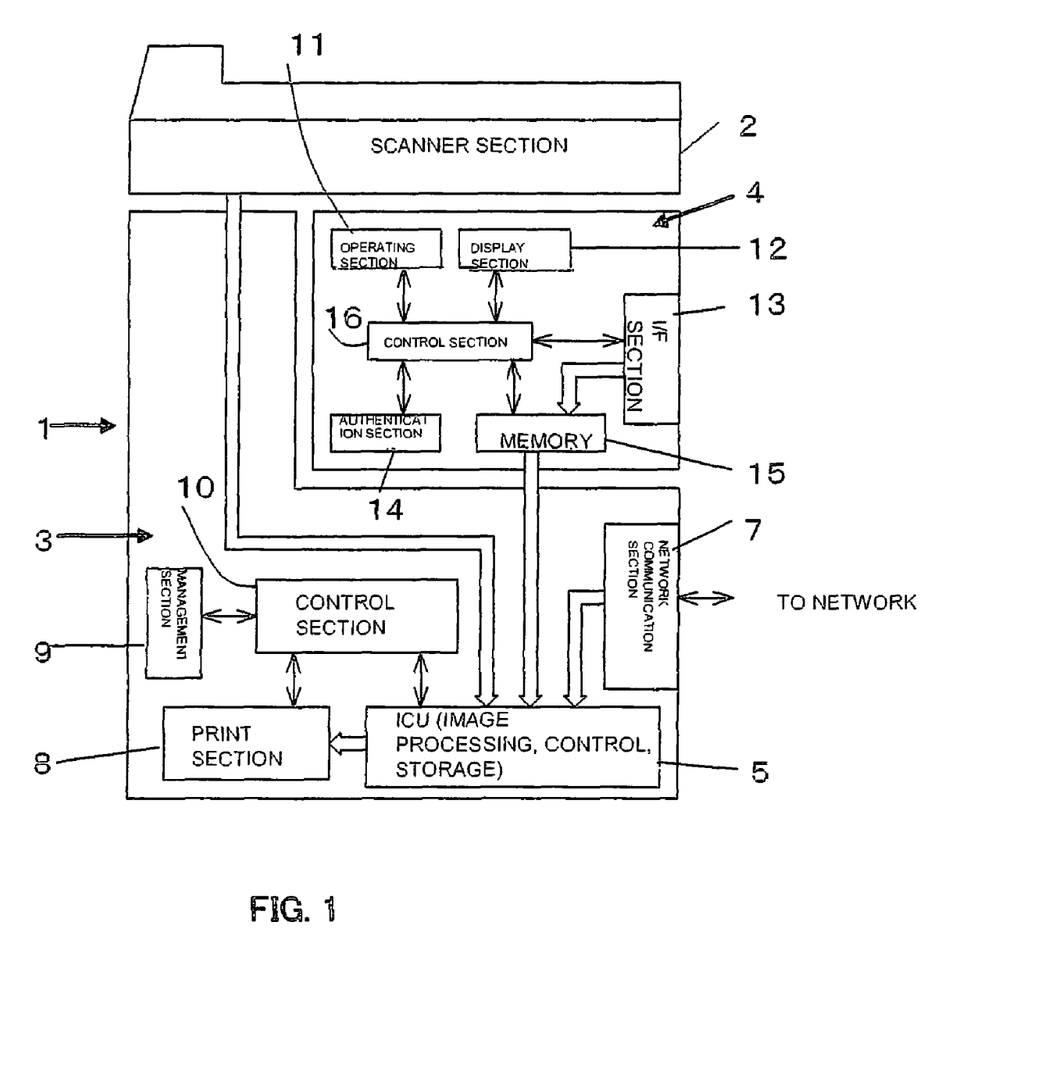
FIG. 1 shows a schematic configuration of an image processing apparatus of the present invention.

An image processing apparatus of this embodiment is shown in FIG. 1. The image processing apparatus 1 is an MFP executing a copy mode, a print mode, a scanner mode and a facsimile mode, and has a scanner section 2 reading an original and inputting image data, an image data processing section 3 processing image data, and an information processing section 4 processing inputted information such as authentication information.

The image data processing section 3 has an image processing section 5 editing, storing and outputting inputted image data, a network communication section 7 carrying out data communication through a network 6, a print section 8 printing and outputting image data, a management section 9 storing control information, setting information and the like of the apparatus as a whole, and a device control section 10 responsible for control of the apparatus as a whole. The image processing section 5 has a hard disk drive and a memory storing image data.

The information processing section 4 has an operating section 11 for input operation, a display section 12 displaying an operation screen, an interface section 13 communicating with a mobile terminal device such as a USB device and an IC card, an authentication section 14 authenticating inputted authentication information, a memory 15 storing information such as authentication information and the like, a control section 16 processing inputted operation information and authentication information. Communication by the interface section 13 is not limited to wired communication, but may be wireless communication.

The operating section 11 and the display section 12 are provided on an operation panel. The operating section 11 has various kinds of operation keys. The display section 12 consists of a liquid crystal display, and is in the form of a touch panel. Touch keys are formed in the operation screen displayed on the display section 12, and these keys also function as operation keys.

Figure 2:
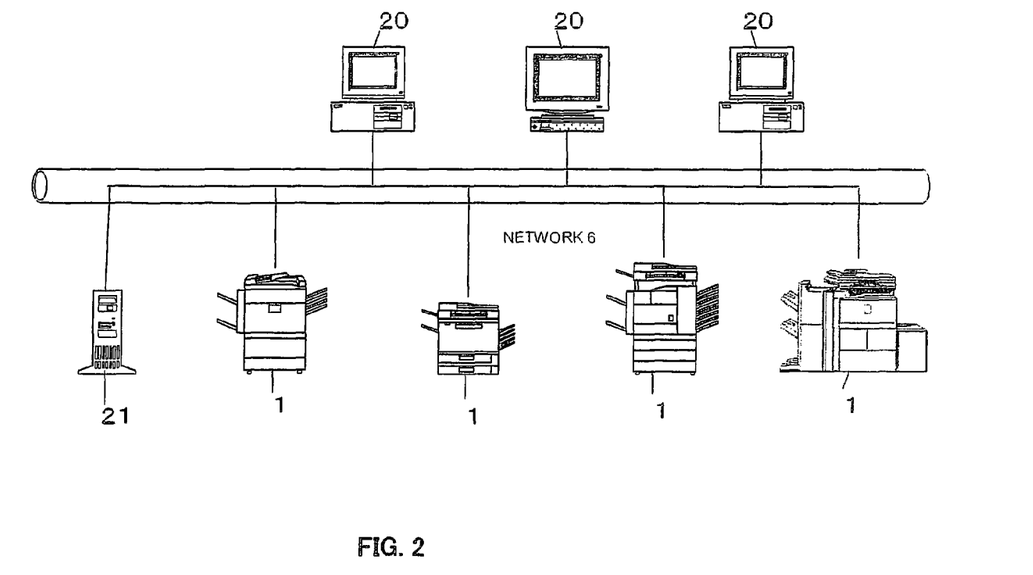
FIG. 2 is a block diagram of a facsimile communication system.

As shown in FIG. 2, a plurality of image processing apparatuses 1 are connected to the network 6 such as a LAN and a WAN. A plurality of external apparatuses are connected to the network 6. External apparatuses include an information processing apparatus 20 such as a personal computer and a server. In this connection, servers include a facsimile server 21, a management server managing the system as a whole, and an authentication server authenticating a user. The network 6 is connected to the Internet through a communication line such as a telephone line and optical fibers from a router. The image processing apparatus 1 is allowed to communicate with the external apparatus through the network 6 by a predetermined communication protocol. Image processing apparatuses 1 are also allowed to mutually communicate. In this connection, communication in the network 6 may be wired or wireless communication.

The facsimile server 21 is a computer apparatus having a facsimile communication function and equipped with a modem apparatus. A telephone line is connected to the modem apparatus. The facsimile server 21 can carry out data communication with a facsimile apparatus. Thus, a facsimile communication system is formed by these image processing apparatuses 1 and external apparatuses.

The image processing apparatus 1 has a modem apparatus, and a telephone line is connected to the modem apparatus. Thus, facsimile communication can be carried out in each image processing apparatus 1. Further, the information processing apparatus 20 may be equipped with a modem apparatus to allow facsimile communication. The image processing apparatus 1 and external apparatus can also carry out data communication by internet facsimile through a network.

In this connection, the image processing apparatus 1 may be a type of apparatus which is not equipped with a modem apparatus. This type of apparatus cannot carry out facsimile communication alone, but can carry out transmission by facsimile through the facsimile server 21.

When image data is inputted, the device control section 10 performs processing in any of a print mode, a copy mode, a scanner mode and a facsimile mode based on processing conditions included in input information from the operating section 11 and header information of the inputted image data.

Image data is sent to the image processing apparatus 1 from the external apparatus through the network 6. The network communication section 7 of the image processing apparatus 1 receives and inputs image data. In the case of reception by facsimile, the modem apparatus inputs image data. Image data is also inputted from the scanner section 2.

In the print mode and copy mode, image processing of image data is carried out in the image processing section 5, and then an image is printed on a recording sheet by the print section 8. In the scanner mode, image data is stored on the hard disk drive, and the image data is sent to the external apparatus through the network communication section 7 in response to a call from the external apparatus. In the facsimile mode, image data is sent to the facsimile apparatus through the modem apparatus. Processing in the copy mode, the scanner mode and the facsimile mode can be performed by an apparatus alone. Such processing is apparatus-specific processing.

The external apparatus has various kinds of applications associated with the image processing apparatus 1. The external apparatus carries out processing appropriate to the application, and operates the image processing apparatus 1 in accordance with the application. Therefore, in this system, the application of the external apparatus and the image processing apparatus 1 can be operated in liaison. The image processing apparatus 1 can not only carry out apparatus-specific processing but also perform various kinds of customized functions by the application.

The application has been developed by an external vendor, and one or more applications are installed in each external apparatus. Processing performed by the application includes processing related to image processing such as color conversion, resolution conversion, scaling, RET and discrimination of specific images, processing related to transmission processing such as time-designated transmission and broadcasting processing, processing related to document processing such as file management, OCR and translation, and processing related to operability such as setting and switching of functions of the image processing apparatus 1, job programming and customization of operations. Facsimile communication is one type of processing that is performed by the application.

A system using such an application is referred to as an OSA (Open Systems Architecture). In the OSA, Web service is performed using an SOAP. Using the SOAP, communication using an HTTP, an HTTPS, an FTP and a TCP/IP are made between the external apparatus and the image processing apparatus 1.

The communication is carried out by the control section consisting of a CPU in the external apparatus, and by the device control section 10 in the image processing apparatus 1. The control section and the device control section 10 operate in accordance with a predetermined program, and thereby carry out communication using the SOAP to send and receive a message. The SOAP is a protocol for calling data and a service on the basis of the XML, HTTP and the like, and provides an instruction for control.

The facsimile server 21 has an application for carrying out facsimile communication. The control section of the facsimile server 21 has an execution section performing facsimile communication in accordance with the application, and a management section managing information concerning facsimile communication.

The execution section sends to a desired transmission destination image data inputted from the image processing apparatus 1 when receiving a request for facsimile communication from the image processing apparatus 1. The execution section receives image data sent from the facsimile apparatus.

The management section manages communication information and communication history information as information concerning facsimile communication. Communication information is information concerning a transmission destination, and includes a transmission destination name, a FAX number, an IP address and a mail address. When communication information is inputted to the image processing apparatus 1 and the information processing apparatus 20 by the user, the inputted communication information is sent to the facsimile server 21. The management section stores the received communication information in a storage device such as a hard disk drive, and registers the information. If communication information has been changed, added, deleted or the like, the management section updates the communication information. Further, communication information is managed for each user and each image processing apparatus 1.

Communication history information includes transmission history information and reception history information. The transmission history information is information concerning a transmission destination, a transmission time, sent image data, a transmission source, a user and the like, and the reception history information is information concerning a reception time, received image data, a transmission source. When transmission or reception by facsimile is carried out, the management section prepares the history information, and stores the information in a storage device such as a hard disk drive.

The management section restricts access to communication history information for viewing and editing the communication history information. Namely, a person having a specific authority, e.g. only a manager, is authorized to make an access, and other persons are not authorized to do so. Therefore, a third party cannot view communication history information, thus making it possible to prevent leakage of information concerning transmission destination and transmission source, and image data.

The image processing apparatus 1 sends image data from the facsimile server 21 using an application for carrying out facsimile communication. For this purpose, the device control section 10 has an access section accessing a desired application, a transmission requesting section requesting the facsimile server 21 for facsimile communication referring to communication information, an information regulation section imposing a restriction of display of communication information acquired from the facsimile server 21 by the transmission requesting section.

The access section establishes communication with the facsimile server 21 through the network communication section 7 to create a state allowing communication. The transmission requesting section acquires communication information from the facsimile server 21 and sends the designated transmission destination and image data to the facsimile server 21. The information regulation section allows display of only one of the transmission destination name and the FAX number included in communication information.

Figure 3:
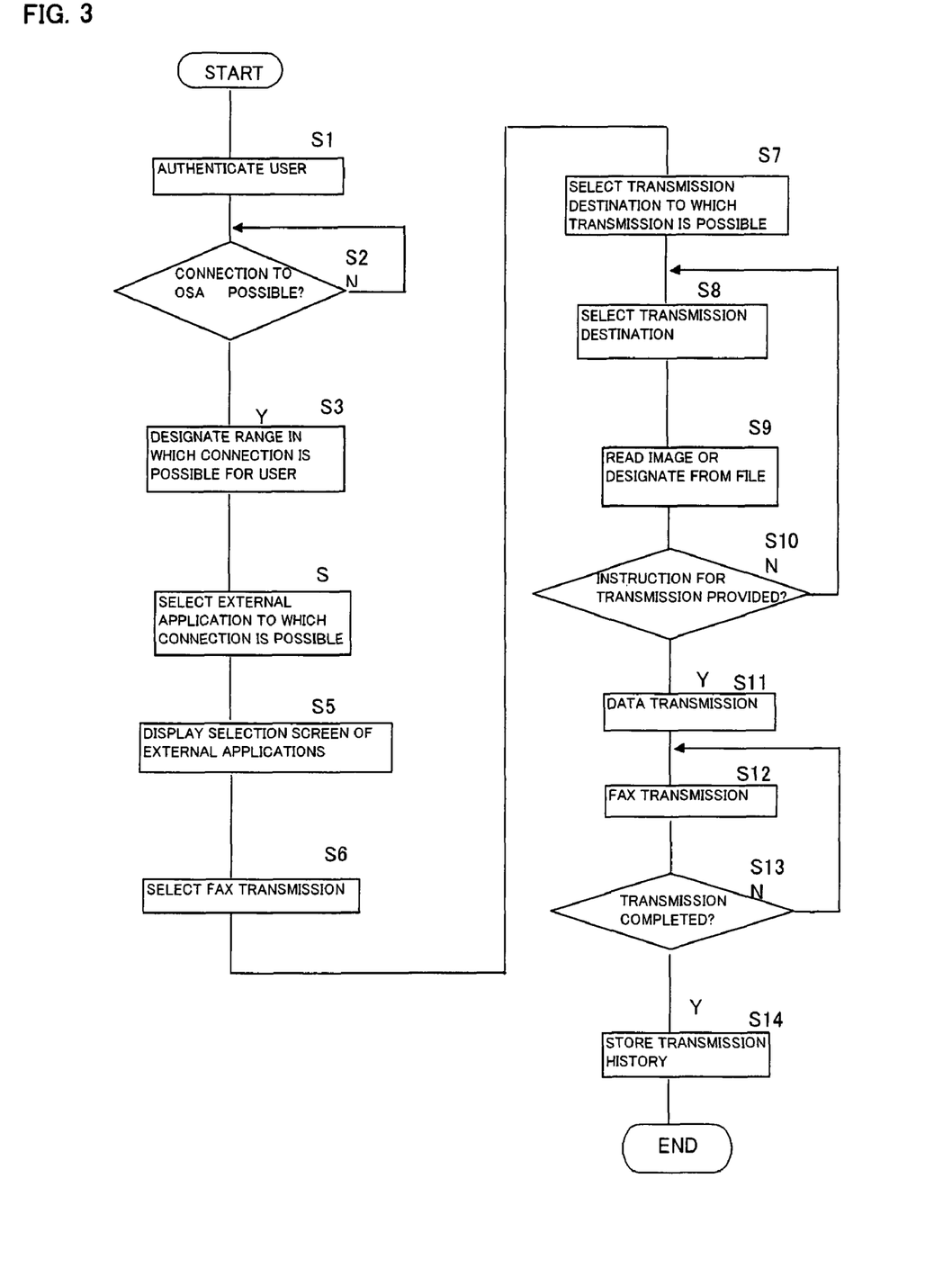
FIG. 3 is a flowchart when image data is sent through a facsimile server.

Operations will be described in accordance with FIG. 3 where the image processing apparatus 1 sends image data using an application. In the image processing apparatus 1, when a user inputs a password or bio-authentication is performed to input authentication information, the authentication section 14 authenticates the user by determining from the authentication information that the user is an enrolled user (S1).

Figure 4:
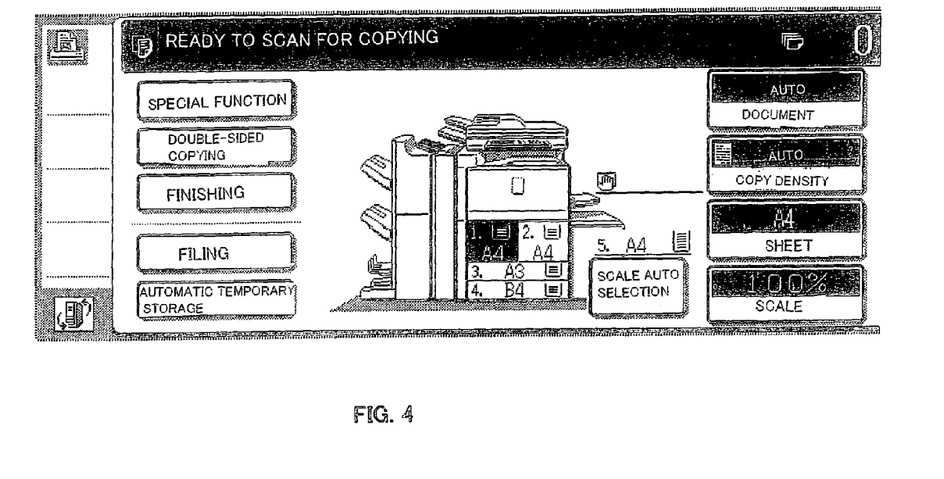
FIG. 4 shows an operation screen for input.

The device control section 10 determines whether an application by the OSA can be used based on registered user information (S2). After determination, an operation screen for input shown in FIG. 4 is displayed. If the user is not permitted to use the application by the OSA, display indicating that the application cannot be used is displayed to warn the user. However, such a user cannot carry out transmission through the facsimile server, but is allowed to perform processing in a facsimile mode in the image processing apparatus 1. Namely, if the FAX number is inputted, image data can be sent from the facsimile server 21.

Figure 5:
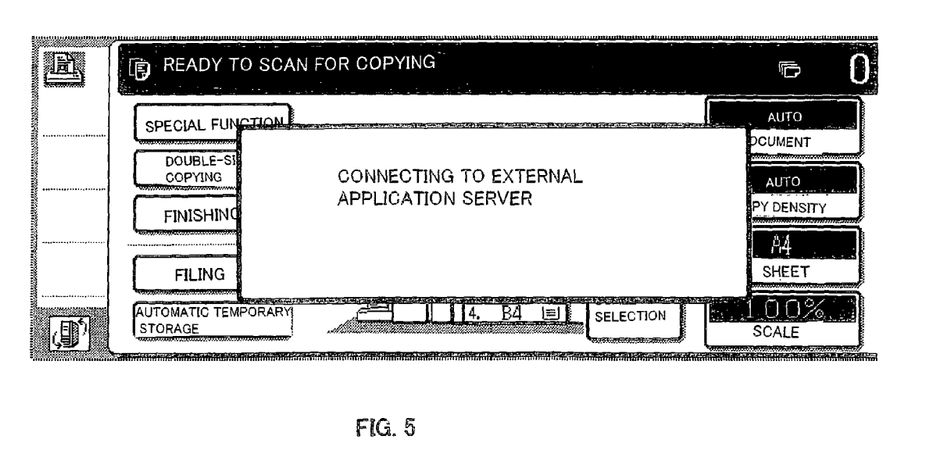
FIG. 5 shows an operation screen during connection to an external apparatus.

When the user operates a connection key for the OSA on the operation screen, the device control section 10 connects itself to external devices to identify an external device capable of communication (S3), as shown in FIG. 5. Here, the external apparatus capable of communication is the management server.

Figure 6:
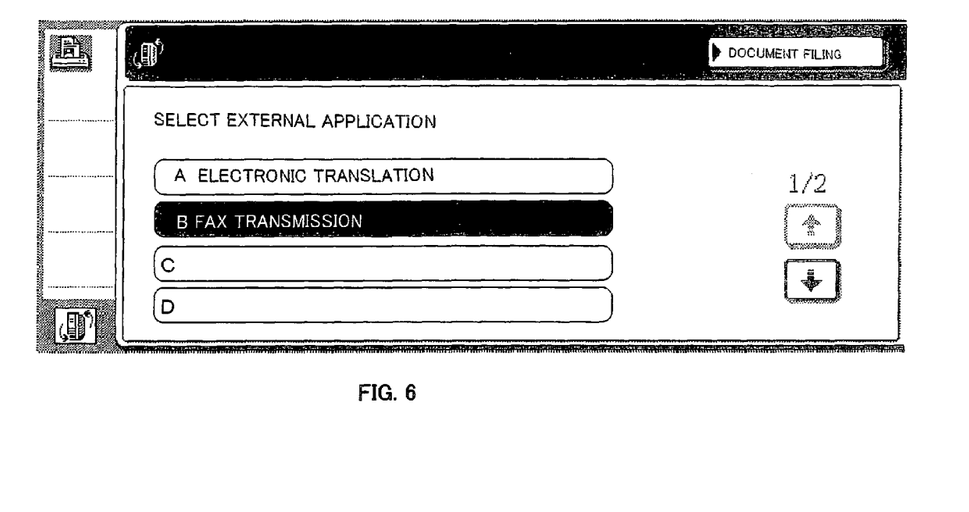
FIG. 6 shows a list screen of selectable applications.

The device control section 10 connects itself to the management server to establish communication, and sends user information to the management server. The management server possesses a management table in which accessible applications for each user are registered. When user information is inputted, the management server selects applications that can be used by the user, based on the management table (S4). The management server sends information of the selected applications to the image processing apparatus 1. In the image processing apparatus 1, when the information of the applications is inputted, a list of selected applications is displayed on the display section 12 (S5) as shown in FIG. 6.

When the user selects FAX transmission on the operation screen (S6), the device control section 10, in response to this selection, connects itself to the facsimile server 21 to start communication. In the facsimile server 21, access from the image processing apparatus 1 starts an application related with facsimile communication. The device controlling apparatus 10 sends user information to the facsimile server 21. The facsimile server 21 selects communication information capable of being sent among communication information based on the user information, and sends the selected communication information to the image processing apparatus 1 (S7).

Figure 7:
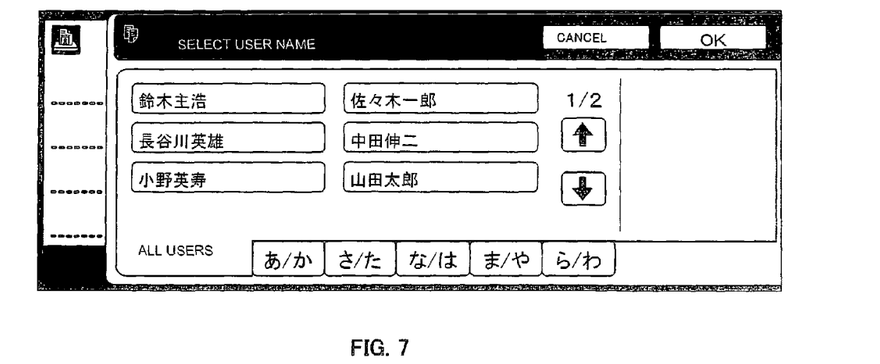
FIG. 7 shows a list screen of transmission destination names.

In the image processing apparatus 1, when communication information is inputted, the device control section 10 displays communication information. At this time, a restriction is imposed on display of communication information. Namely, as shown in FIG. 7, only a list of transmission destination names of communication information is displayed on the display screen, and FAX numbers are not displayed.

The user selects a desired transmission destination referring to the displayed names of transmission destinations capable of being sent (S8). The device control section 10 displays a message to input image data. If image data of a document is sent, the device control section 10 reads the document by the scanner section 2 to input image data. If image data of a file stored in the hard disk drive is sent, the device control section 10 reads out a designated file from the hard disk drive (S9). If image data is sent to a plurality of transmission destinations, the selection of transmission destination and the input of image data described above are repeated.

When an instruction for transmission is provided by the user (S10), the device control section 10 requests the facsimile server 21 for transmission. Namely, the device control section 10 sends the designated transmission destination and image data to the facsimile server 21.

Figure 8:
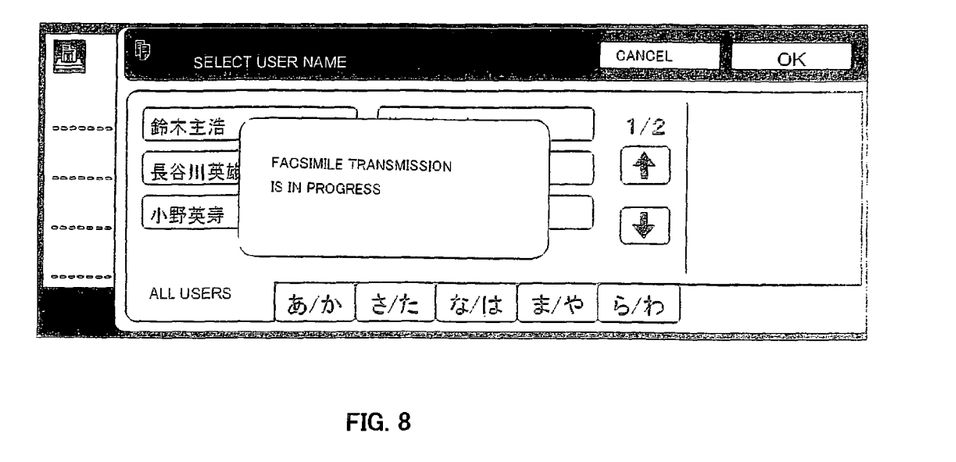
FIG. 8 shows a display screen of a message indicating that transmission by facsimile is in progress.
Figure 9:
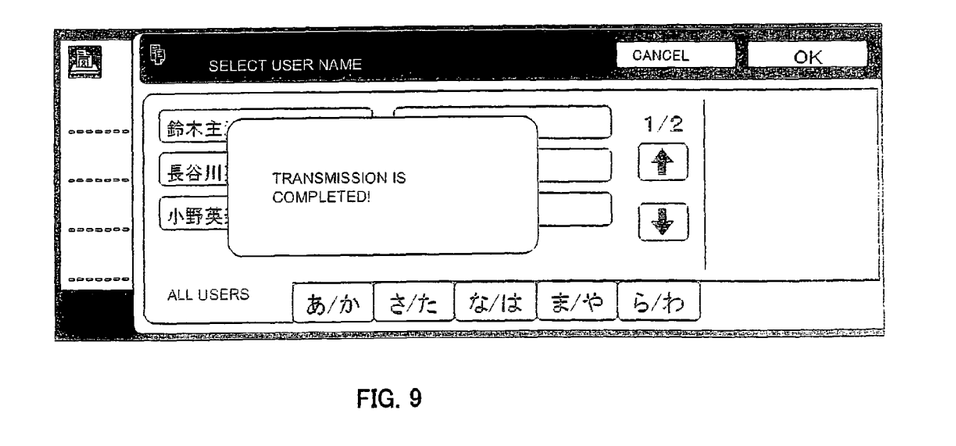
FIG. 9 shows a display screen of a message indicating the end of transmission.
Figure 10:
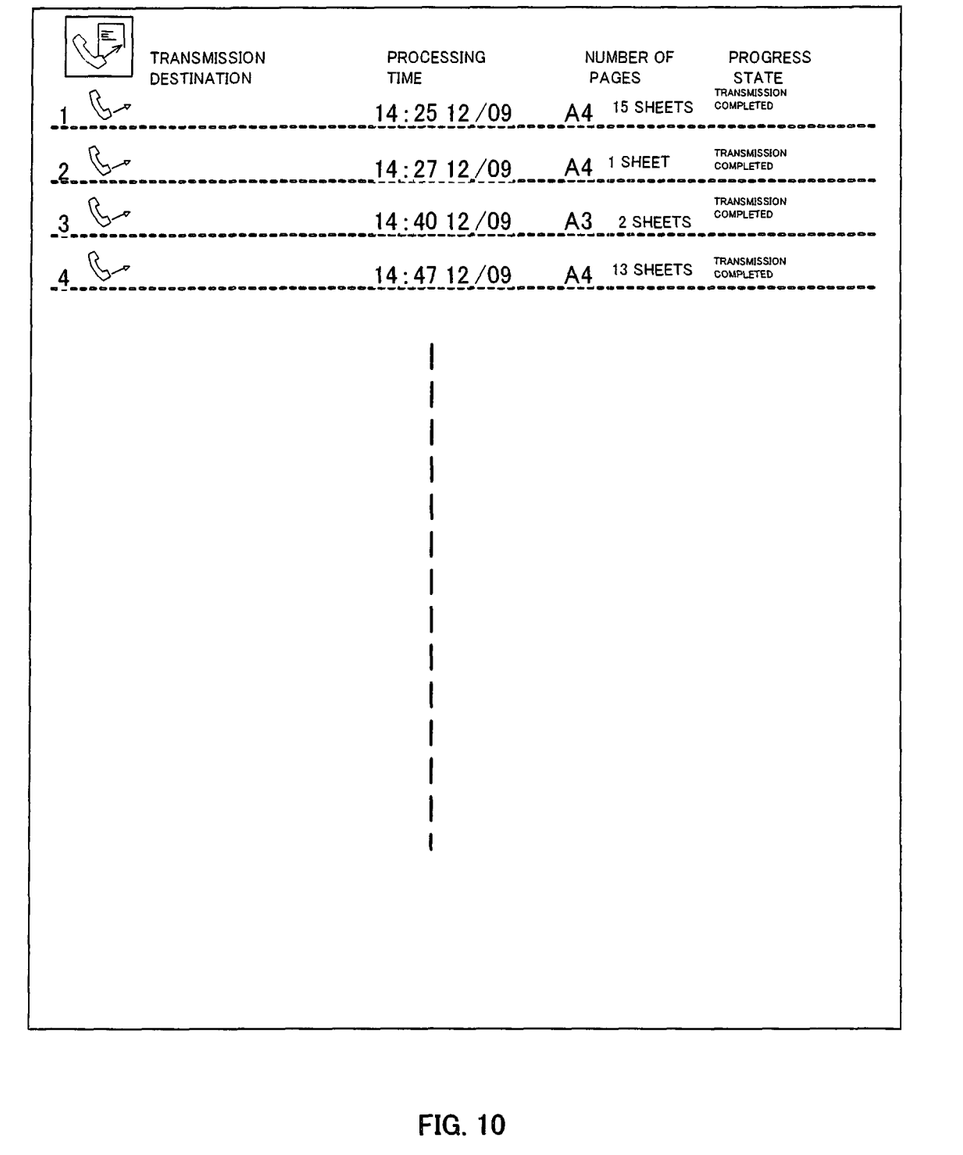
FIG. 10 shows a list of transmission history information prepared in the facsimile server.

The facsimile server 21 receives data from the image processing apparatus 1 (S11), dials up the designated transmission destination and sends image data (S12). At this time, the facsimile server 21 sends to the image processing apparatus 1 information indicating that transmission is in progress, and as shown in FIG. 8, the image processing apparatus 1 displays on the display section 12 a message indicating that transmission is in progress. When transmission is completed (S13), the facsimile server 21 sends information of completion of transmission to the image processing apparatus 1, and as shown in FIG. 9, the image processing apparatus 1 displays a message of completion of transmission on the display section 12. As shown in FIG. 10, the facsimile server 21 prepares transmission history information concerning this transmission, and stores the information in the storage device (S14).

If image data cannot be sent due to a busy situation or the like, the facsimile server 21 carries out retransmission. If image data cannot be sent even by retransmission, the facsimile server 21 carries out processing for deletion of image data as a communication error, and notifies the image processing apparatus 1 of the communication error. In the image processing apparatus 1, display of the communication error is displayed.

The facsimile server 21 can receive image data from the facsimile apparatus. The received image data is stored in the storage device, and reception history information is prepared, and stored in the storage device. In the case of a user of which the destination of the received image data is registered, the facsimile server 21 identifies this user, and notifies the relevant user of the message of facsimile reception by an e-mail or the like.

The user operates the image processing apparatus 1 or the information processing apparatus 20 to provide an instruction to transfer image data from the facsimile server 21. The device control section 10 of the image processing apparatus 1 prints image data inputted from the facsimile server 21. If the user provides the instruction from the information processing apparatus 20, the facsimile server 21 sends image data to the designated image processing apparatus 1, and the image processing apparatus 1 prints inputted image data. Therefore, the user can receive image data at the nearby image processing apparatus 1.

As described above, in the facsimile server 21, communication information is registered and updated, and communication information is unitarily managed. In the image processing apparatus 1, it is unnecessary to manage communication information, and communication information can be shared. Thus, a danger of leakage of communication information from the image processing apparatus 1 is eliminated. When transmission by facsimile is carried out, the image processing apparatus 1 acquires communication information from the facsimile server 21, but a restriction is imposed on display of communication information, and therefore only a part of communication information can be viewed. Hence, even if a third party steals a glance at communication information, all the communication information is not known, thus making it possible to prevent leakage of communication information. Therefore, a facsimile communication system of high security can be formed.

Since a plurality of image processing apparatuses 1 can share communication information, the authenticated user can send image data, through the facsimile server 21, from any of the image processing apparatuses 1. Thus, convenience for the user is improved. The image processing apparatus 1 may request other apparatus for processing for facsimile communication. As a result, processing in a copy mode and a print mode can be carried out intensively, thus making it possible to improve the processing efficiency.

The present invention is not limited to the embodiment described above. Of course, many modifications and changes can be made to the embodiment within the scope of the present invention. In the facsimile communication system, in place of the facsimile server, a function of a server may be added to a specific image processing apparatus to use the image processing apparatus as a facsimile server.

In this embodiment, any one of the transmission destination name and the FAX number is displayed when imposing a restriction on display of communication information, but communication information may be displayed with a part thereof processed into, for example, a transmission destination name and a false FAX number or a FAX number and a false transmission destination. Alternatively, communication information may be displayed with the information processed into a form which can be known only to the user.

What is claimed is:

1. A facsimile communication system, comprising:
an image processing apparatus and a server having a facsimile communication function, the image processing apparatus and the server being communicatively connected via a network, wherein
the server has a management section managing communication information concerning facsimile communication, and
the image processing apparatus has a transmission requesting section requesting the server for facsimile communication referring to the communication information and an information regulation section imposing a restriction on display of the communication information acquired from the server by the transmission requesting section, wherein the information regulation section displays only one of a transmission destination name and a transmission destination number included in the communication information, or displays only one of the transmission destination name and the transmission destination number and makes the other a false display.

2. The facsimile communication system according to claim 1, wherein the transmission requesting section of the image processing apparatus designates a transmission destination from the acquired communication information, and sends image data to the server, and the server sends the image data to the designated transmission destination by facsimile communication.

3. The facsimile communication system according to claim 1, wherein the management section of the server prepares transmission history information of the requested facsimile communication.

4. The facsimile communication system according to claim 3, wherein the management section of the server manages the transmission history information and restricts access to the transmission history information.

5. The facsimile communication system according to claim 1, wherein the communication information is shared, so that a plurality of image processing apparatuses can refer to the communication information.

6. The facsimile communication system according to claim 1, wherein the management section of the server manages communication information for each enrolled user, the image processing apparatus sends to the server user information concerning a user who operates the apparatus, and the server sends to the image processing apparatus communication information corresponding to the user who operates the apparatus.

7. An image processing apparatus communicatively connected via a network to a server having a facsimile communication function, comprising:

a transmission requesting section requesting the server for facsimile communication referring to communication information acquired from the server; and an information regulation section imposing a restriction on display of the communication information acquired from the server by the transmission requesting section, wherein the information regulation section displays only one of a transmission destination name and a transmission destination number included in the communication information, or displays only one of the transmission destination name and the transmission destination number and makes the other a false display.

* * * * *